US012626400B2

(12) United States Patent (10) Patent No.: US 12,626,400 B2
Hsu et al. (45) Date of Patent: May 12, 2026

(54) SYNCHRONIZATION SYSTEM AND SYNCHRONIZATION METHOD OF COORDINATE SYSTEM

(71) Applicant: HTC Corporation, Taoyuan City (TW)

(72) Inventors: YuHui Hsu, Taoyuan City (TW); Cheng-Han Hsieh, Taoyuan City (TW); Su Kang Chou, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 18/937,031

(22) Filed: Nov. 5, 2024

(65) Prior Publication Data

US 2026/0127760 A1 May 7, 2026

(51) Int. Cl.
| | |
|---|---|
| *G06T 7/73* | (2017.01) |
| *G06F 3/01* | (2006.01) |
| *G06F 3/14* | (2006.01) |
| *G06V 10/143* | (2022.01) |
| *G06V 20/20* | (2022.01) |
| *H04W 56/00* | (2009.01) |

(52) U.S. Cl.
CPC ............... *G06T 7/74* (2017.01); *G06F 3/012* (2013.01); *G06F 3/1454* (2013.01); *G06V 10/143* (2022.01); *G06V 20/20* (2022.01); *H04W 56/0015* (2013.01); *G06T 2207/10048* (2013.01); *G06T 2207/30204* (2013.01)

(58) Field of Classification Search
CPC ............. G06T 7/74; G06T 2207/10048; G06T 2207/30204; G06F 3/012; G06F 3/1454; G06V 10/143; G06V 20/20; H04W 56/0015
See application file for complete search history.

(56) References Cited

U.S. PATENT DOCUMENTS

| | | | | |
|---|---|---|---|---|
| 9,838,119 B1* | 12/2017 | Stein | ..................... | G01S 3/7835 |
| 2019/0114802 A1* | 4/2019 | Lazarow | ............. | H04W 56/001 |
| 2019/0243599 A1* | 8/2019 | Rochford | ................ | G06F 3/147 |
| 2023/0139334 A1* | 5/2023 | Jadidian | ............. | H04B 10/1149 |
| | | | | 398/118 |

* cited by examiner

*Primary Examiner* — Abhishek Sarma
(74) *Attorney, Agent, or Firm* — JCIPRNET

(57) ABSTRACT

A synchronization system and a synchronization method of a coordinate system are provided. The synchronization method includes: communicatively connecting a first head-mounted display to a first mobile device, wherein the first mobile device includes a first light source, and the first mobile device and the first head-mounted display correspond to a first coordinate system; outputting a first light based on a first mode by the first light source; identifying the first mobile device according to the first light by a second head-mounted display, wherein the second head-mounted display corresponds to a second coordinate system; and using the first mobile device as a reference point to synchronize the second coordinate system with the first coordinate system by the second head-mounted display.

14 Claims, 3 Drawing Sheets

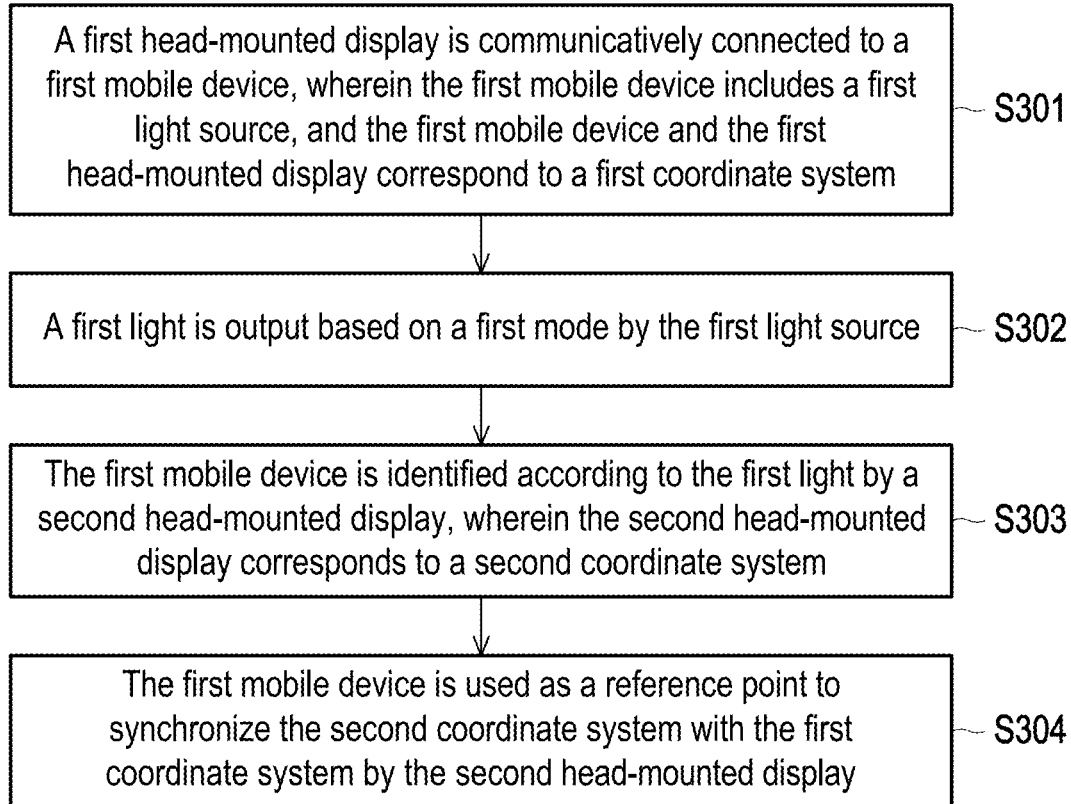

A first head-mounted display is communicatively connected to a first mobile device, wherein the first mobile device includes a first light source, and the first mobile device and the first head-mounted display correspond to a first coordinate system ~ S301

A first light is output based on a first mode by the first light source ~ S302

The first mobile device is identified according to the first light by a second head-mounted display, wherein the second head-mounted display corresponds to a second coordinate system ~ S303

The first mobile device is used as a reference point to synchronize the second coordinate system with the first coordinate system by the second head-mounted display ~ S304

FIG. 3

SYNCHRONIZATION SYSTEM AND SYNCHRONIZATION METHOD OF COORDINATE SYSTEM

BACKGROUND

Technical Field

The disclosure relates to an extended reality (XR) technology, and particularly relates to a synchronization system and synchronization method of a coordinate system.

Description of Related Art

In a traditional XR system, if a plurality of XR devices need to share map information, the XR system needs to establish a reliable communication channel between the XR devices. When the application environment of the XR system lacks reliable communication methods, the XR devices will not be able to share map information. On the other hand, the XR system may be positioned through markers in the field. Taking ArUco markers as an example, different ArUco markers may have different shapes or sizes. Users need to consider ambient light sources to dispose the ArUco markers in the appropriate position. To perform positioning by detecting the ArUco markers, users need to input relevant information about the position of ArUco markers into each XR device in advance. Therefore, the way of performing positioning using the ArUco markers is very inconvenient for users.

SUMMARY

The disclosure provides a synchronization system and a synchronization method of a coordinate system, which may automatically synchronize a coordinate system of a head-mounted display (HMD).

A synchronization system of a coordinate system of the disclosure includes a first mobile device, a first head-mounted display, and a second head-mounted display. The first mobile device includes a first light source. The first head-mounted display is communicatively connected to the first mobile device. The first mobile device and the first head-mounted display correspond to a first coordinate system. The second head-mounted display corresponds to a second coordinate system. The first light source outputs a first light based on a first mode. The second head-mounted display identifies the first mobile device according to the first light, and uses the first mobile device as a reference point to synchronize the second coordinate system with the first coordinate system.

In an embodiment of the disclosure, the synchronization system further includes a second mobile device. The second mobile device includes a second light source. The second light source outputs a second light based on a second mode different from the first mode. The second head-mounted display identifies the first mobile device and the second mobile device according to the first light and the second light respectively to generate an identification result. The second head-mounted display selects the first mobile device from the first mobile device and the second mobile device as the reference point according to the identification result.

In an embodiment of the disclosure, in response to the first light source stopping outputting the first light based on the first mode, the second head-mounted display stops synchronizing the second coordinate system with the first coordinate system.

In an embodiment of the disclosure, the second head-mounted display periodically synchronizes the second coordinate system with the first coordinate system according to the first light.

In an embodiment of the disclosure, the second head-mounted display is communicatively connected to at least one of the first head-mounted display and the first mobile device, and obtains the first coordinate system from at least one of the first head-mounted display and the first mobile device.

In an embodiment of the disclosure, during a period when the first light source outputs the first light based on the first mode, the second head-mounted display and the first head-mounted display perform content sharing.

In an embodiment of the disclosure, the second head-mounted display and the first head-mounted display perform the content sharing through a cloud server.

In an embodiment of the disclosure, the first light source includes an infrared light-emitting diode.

A synchronization method of a coordinate system of the disclosure includes: communicatively connecting a first head-mounted display to a first mobile device, wherein the first mobile device includes a first light source, and the first mobile device and the first head-mounted display correspond to a first coordinate system; outputting a first light based on a first mode by the first light source; identifying the first mobile device according to the first light by a second head-mounted display, wherein the second head-mounted display corresponds to a second coordinate system; and using the first mobile device as a reference point to synchronize the second coordinate system with the first coordinate system by the second head-mounted display.

In an embodiment of the disclosure, the synchronization method further includes: outputting a second light based on a second mode different from the first mode by a second light source of a second mobile device; identifying the first mobile device and the second mobile device according to the first light and the second light respectively by the second head-mounted display to generate an identification result; and selecting the first mobile device from the first mobile device and the second mobile device as the reference point according to the identification result by the second head-mounted display.

In an embodiment of the disclosure, the synchronization method further includes: in response to the first light source stopping outputting the first light based on the first mode, stopping synchronizing the second coordinate system with the first coordinate system by the second head-mounted display.

In an embodiment of the disclosure, the synchronization method further includes: periodically synchronizing the second coordinate system with the first coordinate system according to the first light by the second head-mounted display.

In an embodiment of the disclosure, the synchronization method further includes: communicatively connecting the second head-mounted display to at least one of the first head-mounted display and the first mobile device, and obtaining the first coordinate system from at least one of the first head-mounted display and the first mobile device.

In an embodiment of the disclosure, the synchronization method further includes: during a period when the first light source outputs the first light based on the first mode, performing content sharing by the second head-mounted display and the first head-mounted display.

In an embodiment of the disclosure, the second head-mounted display and the first head-mounted display perform the content sharing through a cloud server.

In an embodiment of the disclosure, the first light source includes an infrared light-emitting diode.

Based on the above, the head-mounted display of the disclosure may identify a specific mobile device through the light output by the mobile device, and then may perform coordinate system synchronization according to the target mobile device. Therefore, the head-mounted display may automatically complete coordinate system synchronization between the head-mounted display and another head-mounted display corresponding to the target mobile device.

BRIEF DESCRIPTION OF THE DRAWINGS

FIG. 3 is a flowchart of a synchronization method of a coordinate system according to an embodiment of the disclosure.

DESCRIPTION OF THE EMBODIMENTS

Figure 1:
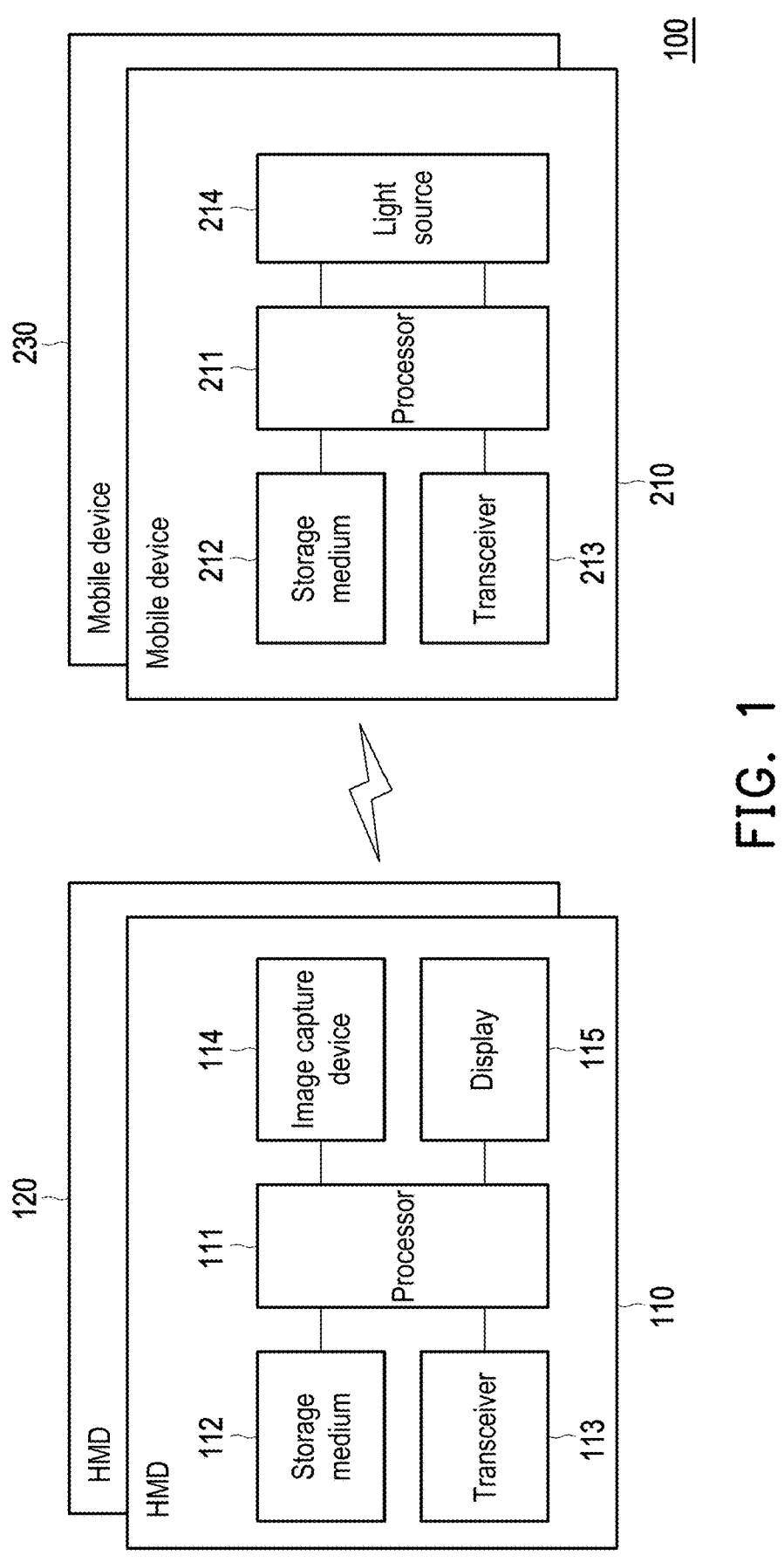
FIG. 1 is a schematic diagram of a synchronization system of a coordinate system according to an embodiment of the disclosure.

FIG. 1 is a schematic diagram of a synchronization system 100 of a coordinate system according to an embodiment of the disclosure. The synchronization system 100 may include one or more head-mounted displays (HMDs) and one or more mobile devices. Specifically, the synchronization system 100 may include an HMD 110, an HMD 120, and a mobile device 210. In an embodiment, the synchronization system 100 may further include a mobile device 230. One or more HMDs and one or more mobile devices may be communicatively connected to each other. The matching HMD and mobile device may have the same coordinate system. For example, assuming that the HMD 110 and the mobile device 210 are matched, the HMD 110 and the mobile device 210 may communicate with each other to achieve coordinate system synchronization.

The HMD (e.g. HMD 110 or 120) may be worn on the user's head, and may be used to provide the user with XR environments (or XR scenes), such as virtual reality (VR) environments, augmented reality (AR) environments, or mixed reality (MR) environments. The mobile device (e.g., mobile device 210 or 230) may be held by the user or worn on the user's body. The user may operate the mobile device to interact with the XR scene provided by the HMD matching the mobile device.

The HMD 110 may include a processor 111, a storage medium 112, a transceiver 113, an image capture device 114, and a display 115. The processor 111 may be, for example, a central processing unit (CPU) or other programmable general-purpose or special-purpose micro control units (MCUs), a microprocessor, a digital signal processor (DSP), a programmable controller, an application specific integrated circuit (ASIC), a graphics unit (GPU), an arithmetic logic unit (ALU), a complex programmable logic device (CPLD), a field programmable gate array (FPGA), or other similar devices, or a combination thereof. The processor 111 may be coupled to the storage medium 112, the transceiver 113, the image capture device 114, and the display 115.

The storage medium 112 may be, for example, any type of fixed or removable random access memory (RAM), a read-only memory (ROM), a flash memory, a hard disk drive (HDD), a solid state drive (SSD), or a similar element, or a combination thereof. The storage medium 112 may be a non-transitory computer-readable storage medium configured to record a plurality of executable computer programs, modules, or applications to be loaded by the processor 111 to perform the functions of the HMD 110.

The transceiver 113 may be configured to transmit or receive wired or wireless signals. The transceiver 113 may also perform operations such as low-noise amplification, impedance matching, frequency mixing, up or down frequency conversion, filter amplification, and the like. The processor 111 may communicate with other devices (e.g., HMD 120, mobile device 210, or mobile device 230) via the transceiver 113.

The image capture device 114 may be a camera for capturing images. The image capture device 114 may include a complementary metal oxide semiconductor (CMOS) sensor or a charge-coupled device (CCD) sensor.

The display 115 may be used to display image data, such as providing an XR environment or XR scene for the user wearing the HMD 110. The display 115 may include a liquid-crystal display (LCD) or an organic light-emitting diode (OLED) display. In an embodiment, the display 115 may provide an image beam to the user's eyes to form an image on the user's retina such that the user may see the XR scene created by HMD 110.

The mobile device 210 may be paired with an HMD (e.g., HMD 110) and may be communicatively connected to each other. The mobile device 210 may communicate to share the same coordinate system as a matching HMD. The mobile device 210 may include a processor 211, a storage medium 212, a transceiver 213, and one or more light sources 214.

The processor 211 may be, for example, a CPU or other programmable general-purpose or special-purpose MCUs, a microprocessor, a DSP, a programmable controller, an ASIC, a GPU, an ALU, a CPLD, an FPGA, or other similar devices, or a combination thereof. The processor 211 may be coupled to the storage medium 212, the transceiver 213, and the light source 214.

The storage medium 212 may be, for example, any type of fixed or removable RAM, an ROM, a flash memory, an HDD, an SSD, or a similar element, or a combination thereof. The storage medium 212 may be a non-transitory computer-readable storage medium configured to record a plurality of executable computer programs, modules, or applications to be loaded by the processor 211 to perform the functions of the mobile device 210.

The transceiver 213 may be configured to transmit or receive wired or wireless signals. The transceiver 213 may also perform operations such as low-noise amplification, impedance matching, frequency mixing, up or down frequency conversion, filter amplification, and the like.

The processor 211 may communicate with other devices (e.g., HMD 110, HMD 120, or mobile device 230) via the transceiver 213.

The light source 214 is used to output light. Multiple light sources 214 may be used to output alight pattern. The HMD 110 may capture an image of the light pattern and may calculate a rotation or a translation of the mobile device 210 according to the image based on perspective-n-point (PnP) algorithm. The rotation or the translation of the mobile device 210 may be used as reference positions for the HMD 110 and the mobile device 210. The light source 214 is, for example, an infrared light-emitting diode (IR LED). The light output by the infrared light-emitting diode is invisible light that is highly concealable and does not affect the user's visual experience.

In an embodiment, the HMD 120 may have a similar structure or function as the HMD 110. The HMD 120 may use the same or different coordinate system from the coordinate system used by the HMD 110 or the mobile device 210, or may use the same or different coordinate system from the coordinate system used by the mobile device 230. The mobile device 230 may have a similar structure or function as the mobile device 210. The mobile device 230 may use the same or different coordinate system from the coordinate system used by the HMD 110 or the mobile device 210, or may use the same or different coordinate system from the coordinate system used by the HMD 210.

Figure 2:
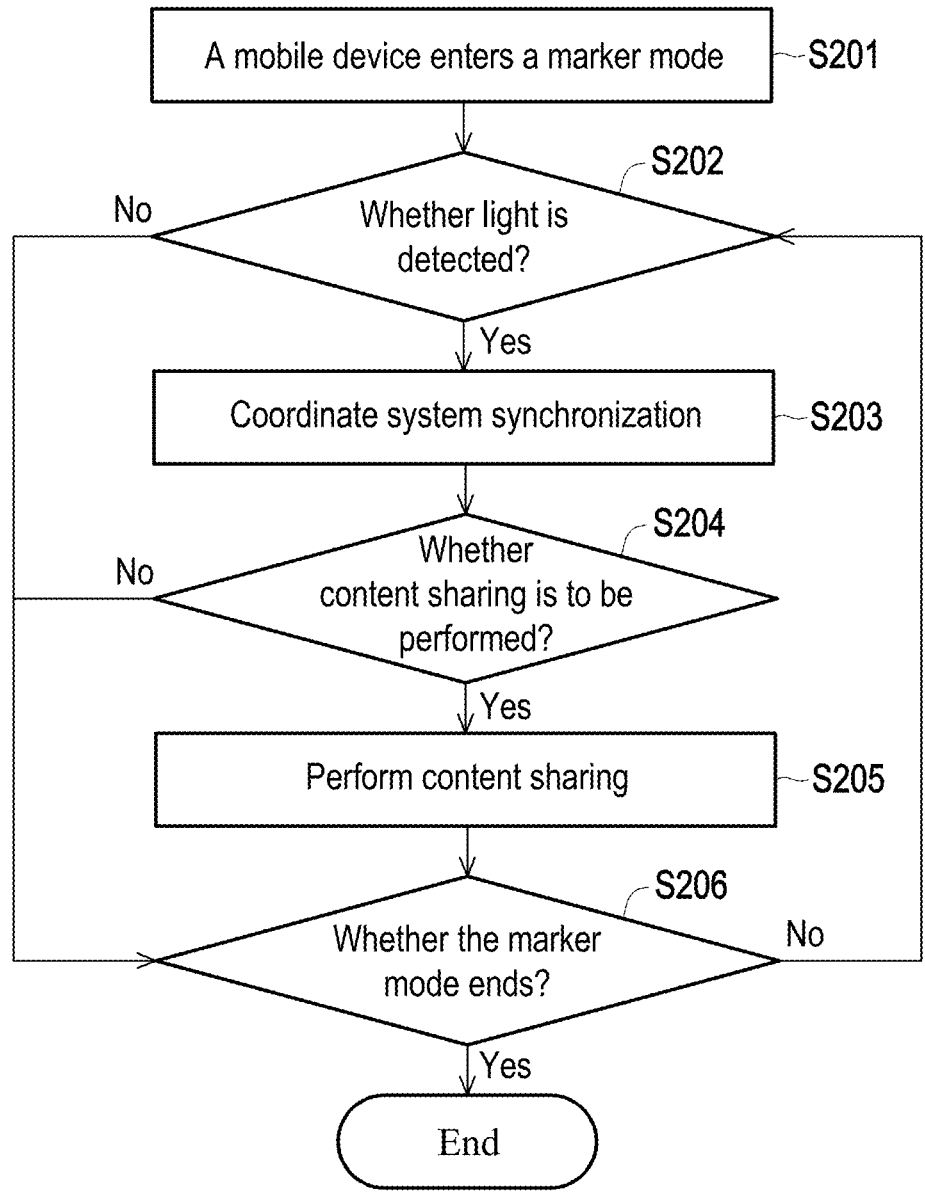
FIG. 2 is a flowchart of coordinate system synchronization according to an embodiment of the disclosure.

FIG. 2 is a flowchart of coordinate system synchronization according to an embodiment of the disclosure. The flowchart may be implemented by the synchronization system 100 shown in FIG. 1.

In step S201, the mobile device 210 may receive a user instruction to enter a marker mode. During the marker mode, the mobile device 210 may output light (e.g., infrared light) in a specific pattern through a set of light sources 214. The pattern may be associated with factors such as one or more activated light sources 214 in the set of light sources 214, the intensity of the output light, or the frequency of the flicker. The pattern of the light output by the mobile device 210 based on a specific pattern may be used to indicate the identity of the mobile device 210, and the light output by the mobile device 210 may be used to indicate the position of the mobile device 210.

In step S202, the HMD 120 may detect the light output by the mobile device 210 through the image capture device. If the light output by the mobile device 210 is detected, step S203 is entered. If the light output by the mobile device 210 is not detected, step S206 is entered.

In an embodiment, assuming that the field contains a plurality of mobile devices in the marker mode, the HMD 120 may identify the identity of the mobile device according to the pattern of the light output by the mobile device, and then may decide to select a synchronization object from the plurality of mobile devices. For example, assume that the mobile device 210 in the marker mode outputs light in a first mode, and the mobile device 230 in the marker mode outputs light in a second mode. After detecting the light output by the mobile device 210 or the light output by the mobile device 230, the HMD 120 may identify the identity of the mobile device corresponding to the detected light pattern according to the information pre-stored in the storage medium, and then may produce an identification result. The HMD 120 may also determine the position of the mobile device according to the detected light. Assuming that the synchronization object of the HMD 120 is the mobile device 210, the HMD 120 may select the mobile device 210 from the detected mobile device 210 and the mobile device 230 according to the identification result, and may obtain the position information of the mobile device 210.

In step S203, the HMD 120 may use the position of the mobile device 210 as a reference point to perform coordinate system synchronization. The HMD 120 may synchronize the coordinate system of the HMD 120 with the coordinate system of the mobile device 210 (or HMD 110) according to the reference point. In an embodiment, the HMD 120 may communicate with the mobile device 210 (or the HMD 110) to obtain the coordinate system of the mobile device 210 (or the HMD 110) from the mobile device 210 (or the HMD 110). Then, the HMD 120 may synchronize the two coordinate systems according to the reference point (i.e., the position of the mobile device 210), so that the coordinate system of the HMD 120 is the same as the coordinate system of the mobile device 210 (or HMD 110).

In step S204, the HMD 120 may determine whether to perform content sharing between the HMD 120 and the HMD 110. If the HMD 120 determines that content sharing is to be performed, step S205 is entered. If the HMD 120 determines not to perform content sharing, step S206 is entered.

In step S205, the HMD 120 performs content sharing between the HMD 120 and the HMD 110. Specifically, the HMD 120 may be communicatively connected to the HMD 110, and may transmit data to the HMD 110 or receive data from the HMD 110. In an embodiment, the HMD 120 may communicate with the HMD 110 through an external communication device such as a cloud server, and then perform content sharing through the external communication device.

In step S206, the HMD 120 may determine whether the marker mode of the mobile device 210 ends. If the marker mode has ended, the process is stopped. If the marker mode has not ended, step S202 is performed again. Specifically, HMD 120 may stop synchronizing the coordinate system of the HMD 120 with the coordinate system of the mobile device 210 (or HMD 110) in response to light source 214 of mobile device 210 stopping outputting light based on a specific pattern.

In an embodiment, the HMD 120 may periodically synchronize the coordinate system of the HMD 120 with the coordinate system of the mobile device 210 (or HMD 110) according to the light output by the mobile device 210.

FIG. 3 is a flowchart of a synchronization method of a coordinate system according to an embodiment of the disclosure. The synchronization method may be implemented by the synchronization system 100 shown in FIG. 1. In step S301, the first head-mounted display is communicatively connected to the first mobile device, wherein the first mobile device includes the first light source, and the first mobile device and the first head-mounted display correspond to the first coordinate system. In step S302, the first light is output based on the first mode by the first light source. In step S303, the first mobile device is identified according to the first light by the second head-mounted display, wherein the second head-mounted display corresponds to the second coordinate system. In step S304, the first mobile device is used as a reference point to synchronize the second coordinate system with the first coordinate system by the second head-mounted display.

In summary, the mobile device of the synchronization system of the disclosure may output light for identity identification based on a specific pattern. When there are a plurality of mobile devices in the application field of the synchronization system, the head-mounted display may determine the mobile device as the target according to the light pattern output by the mobile device, and then may use the mobile device as the reference point to perform coordinate system synchronization. Compared with the traditional coordinate system synchronization method, the disclosure may quickly locate the synchronization object from the application field for the head-mounted display or select the synchronization object from numerous mobile devices, and then may perform coordinate system synchronization. In addition, users of the disclosure do not need to set markers in the application field of the synchronization system. The light source of the mobile device of the disclosure may adapt to various light conditions. The light output by the light source may be invisible light with better concealment.

Therefore, the synchronization system may complete the synchronization without disturbing the visual experience of individual users.

What is claimed is:

1. A synchronization system of a coordinate system, comprising:
    a first mobile device, comprising a first light source;
    a second mobile device, comprising a second light source;
    a first head-mounted display, communicatively connected to the first mobile device, wherein the first mobile device and the first head-mounted display correspond to a first coordinate system; and
    a second head-mounted display, corresponding to a second coordinate system,
    wherein the first light source outputs a first light based on a first mode, and the second light source outputs a second light based on a second mode different from the first mode,
    wherein the second head-mounted display identifies the first mobile device and the second mobile device according to the first light and the second light respectively to generate an identification result, and selects the first mobile device from the first mobile device and the second mobile device as a reference point according to the identification result to synchronize the second coordinate system with the first coordinate system.

2. The synchronization system according to claim 1, wherein
    in response to the first light source stopping outputting the first light based on the first mode, the second head-mounted display stops synchronizing the second coordinate system with the first coordinate system.

3. The synchronization system according to claim 1, wherein
    the second head-mounted display periodically synchronizes the second coordinate system with the first coordinate system according to the first light.

4. The synchronization system according to claim 1, wherein
    the second head-mounted display is communicatively connected to at least one of the first head-mounted display and the first mobile device, and obtains the first coordinate system from the at least one of the first head-mounted display and the first mobile device.

5. The synchronization system according to claim 1, wherein
    during a period when the first light source outputs the first light based on the first mode, the second head-mounted display and the first head-mounted display perform content sharing.

6. The synchronization system according to claim 5, wherein
    the second head-mounted display and the first head-mounted display perform the content sharing through a cloud server.

7. The synchronization system according to claim 1, wherein the first light source comprises an infrared light-emitting diode.

8. A synchronization method of a coordinate system, comprising:
    communicatively connecting a first head-mounted display to a first mobile device, wherein the first mobile device comprises a first light source, and the first mobile device and the first head-mounted display correspond to a first coordinate system;
    outputting a first light based on a first mode by the first light source, and outputting a second light based on a second mode different from the first mode by a second light source of a second mobile device;
    identifying the first mobile device and the second mobile device according to the first light and the second light respectively by a second head-mounted display to generate an identification result, wherein the second head-mounted display corresponds to a second coordinate system; and
    selecting the first mobile device from the first mobile device and the second mobile device as a reference point according to the identification result to synchronize the second coordinate system with the first coordinate system by the second head-mounted display.

9. The synchronization method according to claim 8, further comprising:
    in response to the first light source stopping outputting the first light based on the first mode, stopping synchronizing the second coordinate system with the first coordinate system by the second head-mounted display.

10. The synchronization method according to claim 8, further comprising:
    periodically synchronizing the second coordinate system with the first coordinate system according to the first light by the second head-mounted display.

11. The synchronization method according to claim 8, further comprising:
    communicatively connecting the second head-mounted display to at least one of the first head-mounted display and the first mobile device, and obtaining the first coordinate system from the at least one of the first head-mounted display and the first mobile device.

12. The synchronization method according to claim 8, further comprising:
    during a period when the first light source outputs the first light based on the first mode, performing content sharing by the second head-mounted display and the first head-mounted display.

13. The synchronization method according to claim 12, wherein the second head-mounted display and the first head-mounted display perform the content sharing through a cloud server.

14. The synchronization method according to claim 8, wherein the first light source comprises an infrared light-emitting diode.

* * * * *